WILLIAM J. FRANKLIN,
NEIL C. MARTIN,
*INVENTORS*

BY

*ATTORNEYS*

Jan. 18, 1966

W. J. FRANKLIN ETAL 3,229,884

SEGMENTED BACK-UP BAR

Filed Jan. 30, 1964

WILLIAM J. FRANKLIN,
NEIL C. MARTIN,
INVENTORS

BY

ATTORNEYS

Jan. 18, 1966   W. J. FRANKLIN ETAL   3,229,884
SEGMENTED BACK-UP BAR

Filed Jan. 30, 1964

WILLIAM J. FRANKLIN,
NEIL C. MARTIN,
INVENTORS

BY

ATTORNEYS

Jan. 18, 1966

W. J. FRANKLIN ETAL 3,229,884

SEGMENTED BACK-UP BAR

Filed Jan. 30, 1964

WILLIAM J. FRANKLIN,
NEIL C. MARTIN,
INVENTORS

BY

ATTORNEYS

Jan. 18, 1966  W. J. FRANKLIN ETAL  3,229,884
SEGMENTED BACK-UP BAR

Filed Jan. 30, 1964

WILLIAM J. FRANKLIN,
NEIL C. MARTIN,
INVENTORS

BY

ATTORNEYS

United States Patent Office 3,229,884
Patented Jan. 18, 1966

3,229,884
SEGMENTED BACK-UP BAR
William J. Franklin and Neil C. Martin, Huntsville, Ala., assignors to the United States of America as represented by the Administrator of the National Aeronautics and Space Administration
Filed Jan. 30, 1964, Ser. No. 341,467
5 Claims. (Cl. 228—50)
(Granted under Title 35, U.S. Code (1952), sec. 266)

The invention described herein may be manufactured and used by or for the Government of the United States of America without the payment of any royalties thereon or therefor.

This invention relates to improvements in backing elements for the use in welding operations and more particular to a back-up bar for use in welding cylindrical tubular structures.

It is a common practice in butt welding edges of plates to apply a back-up bar or strip on the side opposite the welding operations to prevent the molten weld metal from running out of the joint or seam. The back-up bar maintains uniform contact with the plates at opposite sides of the seam to retain all the molten metal in the seam during the welding operation and to aid in the alignment of the plates.

In assembling the large cylindrical tubular body or tank sections of large rocket boosters, each sections has heretofore been welded to its adjacent section by utilizing a substantially continuous back-up bar which was designed and built for the specific diameter of the joint seam being welded. These backup bars were normally supported from the floor by a large center "spider" structure which extended within the tubular sections which were located endwise to the floor. The "spider" structure urged the back-up bar tightly against the surfaces of the tubular sections adjacent the contiguous end edges which were to be welded.

This arrangement, however, becomes excessively expensive and cumbersome for cylindrical tubular body sections having large diameters. Even a slight change in the size of the body sections requires extensive modification of the back-up bar and its supporting "spider" structure. Also, the back-up bar and its supporting structure requires a considerable amount of valuable floor space whether it is in use or not.

Accordingly, it is an object of the present invention to provide a back-up bar which is substantially self-supporting, thereby, eliminating the need for a large supporting structure.

Another object is to provide a back-up bar which may easily be assembled from segments and then later disassembled for storage.

Yet another object is to provide a back-up bar with a contact surface plate which is longitudinally extending flexible and also yieldable to maintain the bar tightly against the plates at opposite sides of the seam.

Other objects, uses, and advantages of the present invention will become apparent as the description proceeds.

The invention consists of a back-up bar composed of similar short arcuate segments. Each segment having a rigid channel member which receives an elastomeric ribbon member which has a plurality of contact surface plates dovetailed therein. Beneath the elastomeric material is an inflatable bladder which is adapted to inflate and push the elastomeric ribbon member so its contact surface plates are pressed against the tubular body sections at opposite side of the seam.

The arcuate back-up bar segments are assembled directly on one of the tubular body sections by utilizing simple support devices which temporarily attach themselves directly on a body surface adjacent the edge to be seam welded. When the arcuate back-up bar segments are assembled to form a complete ring within the tubular section, the bladders of each segment are inflated to cause the contact surface plates to press against the tubular body sections on each side of the seam so that the back-up bar ring frictionally grips the body sections and becomes self-supporting. The simple support devices are under no load following inflation of the bladders. Thus, it can be seen that the cumbersome separate supporting structure used heretofore has been eliminated. While it is apparent that the back-up bar of the present invention is particularly valuable for tubular sections having a diameter of twenty feet or more, it may also be readily used for much smaller tubular sections.

This will be more readily understood by the following detailed description when taken together with the accompanying drawings in which.

Figure 1:
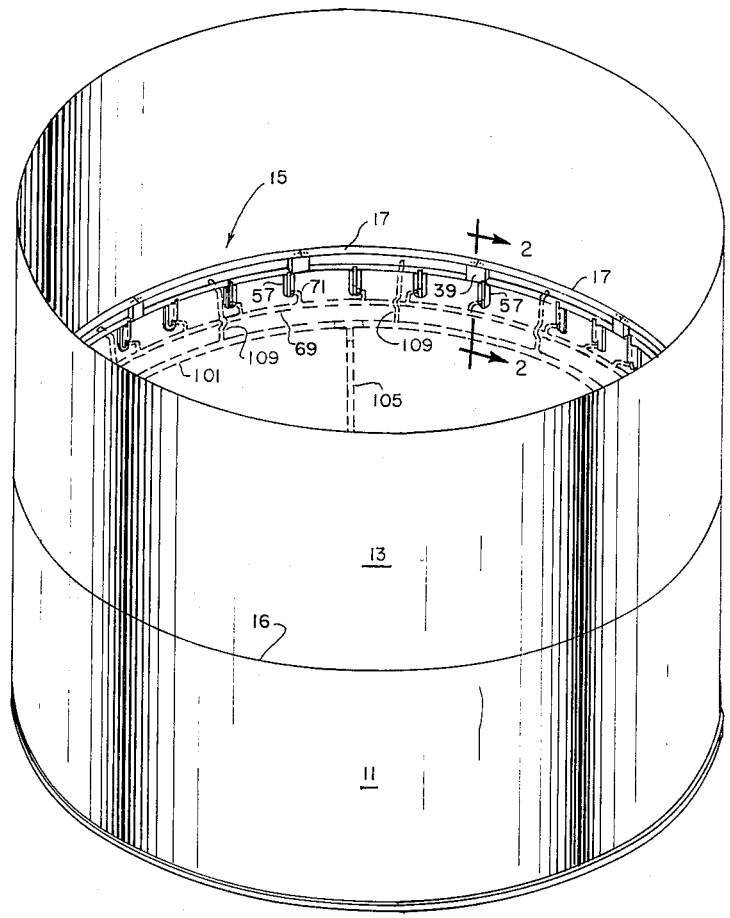
FIGURE 1 is a perspective view of two tubular sections with a back-up bar of the present invention along the joint to be welded.

Referring now to FIGURE 1 which shows two large cylindrical tubular sections 11 and 13 with a circular ring back-up bar 15 of the present invention along the joint 16 to be welded.

Figure 2:
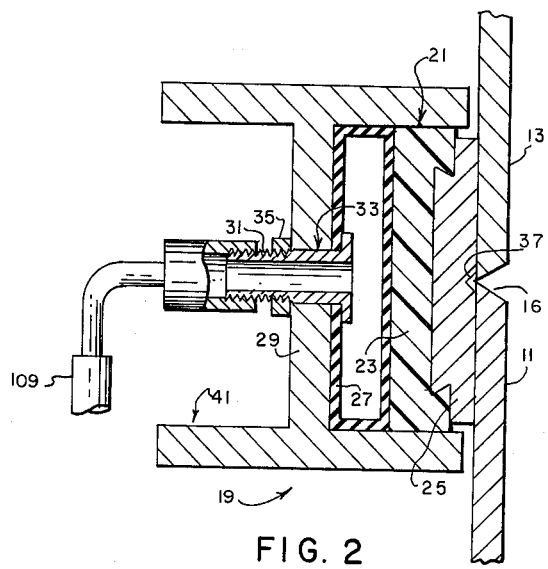
FIGURE 2 is a cross-section view taken along line 2—2 of FIGURE 1.
Figure 3:
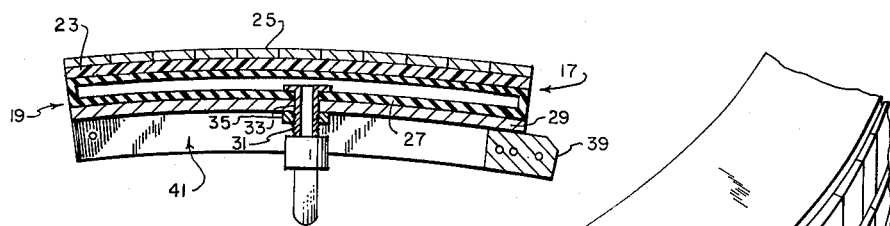
FIGURE 3 is a longitudinal cross-section view of one segment of the back-up bar shown in FIGURE 1.
Figure 4:
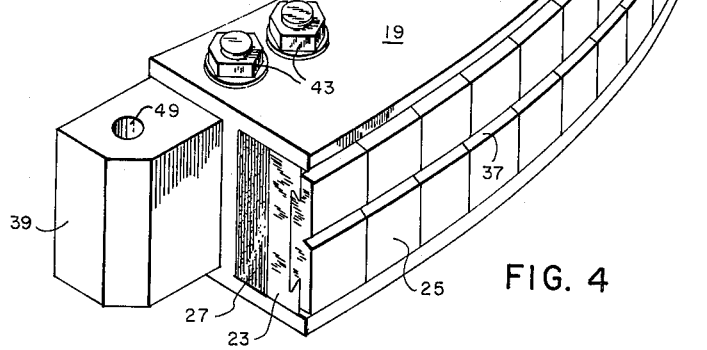
FIGURE 4 is a perspective end view of one end of a segment of the back-up bar shown in FIGURE 1.

The back-up bar 15 is composed essentially of similar line segments 17. Each segment 17 as illustrated in FIGURES 2 and 3 has a rigid arcuate I-shaped frame 19. In the outer channel 21 of the I-shaped frame 19 is fitted a heat resistent, resilient, flexible, ribbon member 23 which has a plurality of longitudinally contiguous contact surface plates 25 dovetailed therein. Beneath the ribbon mmeber 23 and bonded thereto is an inflatable bladder 27 which is adapted to inflate and push the ribbon member 23 so its surface plates 25 are pressed against the inner surface of the tubular body sections 11 and 13 at opposite sides of the joint 16 to be welded. The inflatable bladder 27 is bonded to the web 29 of the rigid frame 19 and has a single air inlet tube 31 which extends through a hole 33 in the frame web 29 and is securely held therein by a threaded nut 35.

Each contact surface plate 25 is elongated and transversely aligned to the ribbon member 23 so it may easily conform to the longitudinal irregularities and warpage of the tubular sections 11 and 13 and also easily be adapted to rigid frame members of different diameters. The width of the plates 25 is not critical and depends on the expected longitudinal variance needed.

The contact surface plates 25 may have a conventional groove 37 or mold which will receive the molten metal from the seam joint 16 during the welding operations to form a bead along the underside of the weld.

Because of the high heat involved at the joint 16, it is preferred if the surface plates 25 are made of stainless steel and the ribbon member 23 be made of silicone rubber. The inflatable bladder 27 may be made of natural rubber.

Figure 8:
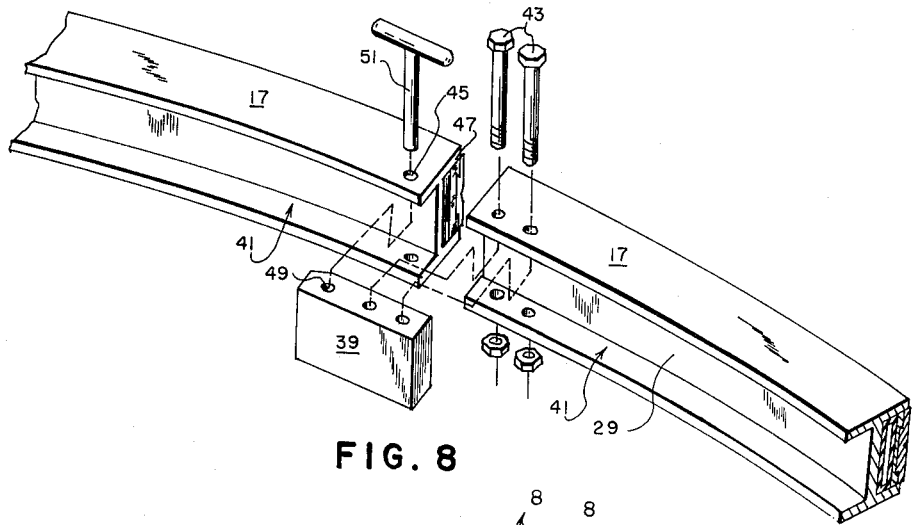
FIGURE 8 is an enlarged disassembled perspective view taken along line 8—8 of FIGURE 7 showing a line joint between segments of the back-up bar.

At one end of each normal or line back-up bar segment 17 is a splice plate 39, shown best in FIGURE 8, which is secured to the inside channel 41 of the rigid frame 17 by two bolts 43 so approximately half its length extends outwardly from the segment end to be received within the inside channel of the frame of the adjacent back-up bar segment 17. The normal back-up bar segment 17 has at least one bore 45 extending through the inside flanges of the I-shaped frame 19 adjacent the end 47 opposite the splice plate 39. The bore 45 aligns with a bore 49 in the splice plate 39 of the adjacent back-up bar segment 17 so a dowel 51 may be dropped therein to securely lock the adjacent segments 17 together.

Figure 5:
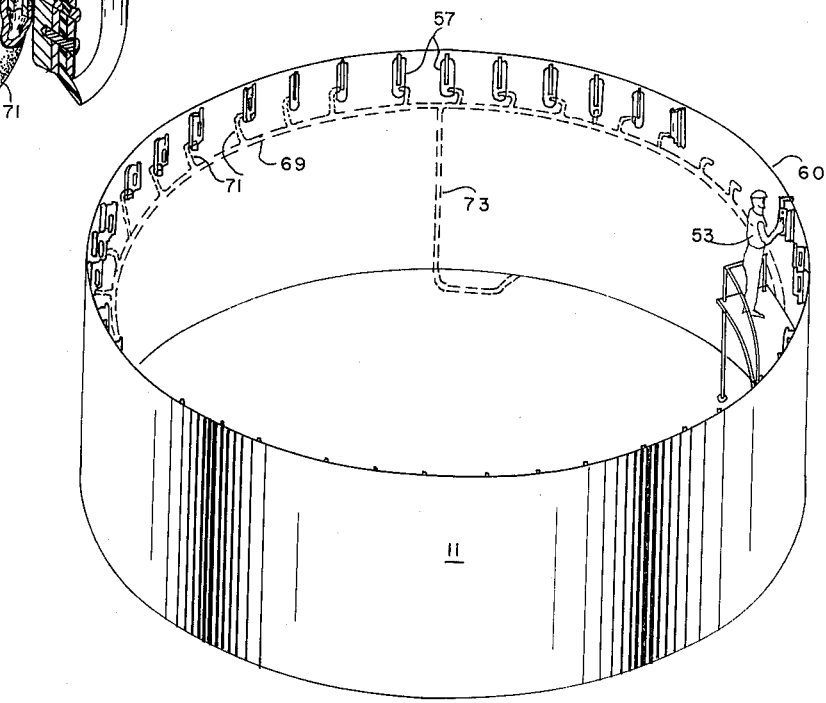
FIGURE 5 is a perspective view illustrating the first step taken before assembling the back-up bar shown in FIGURE 1.
Figure 7:
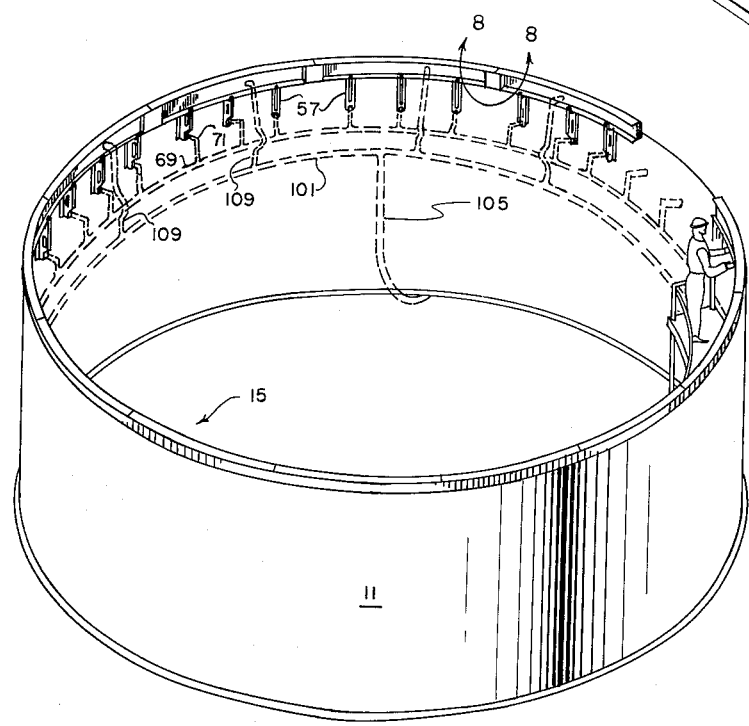
FIGURE 7 is a perspective view illustrating the assembly of the back-up bar shown in FIGURE 1, the top tubular section being removed for clarity.
Figure 9:
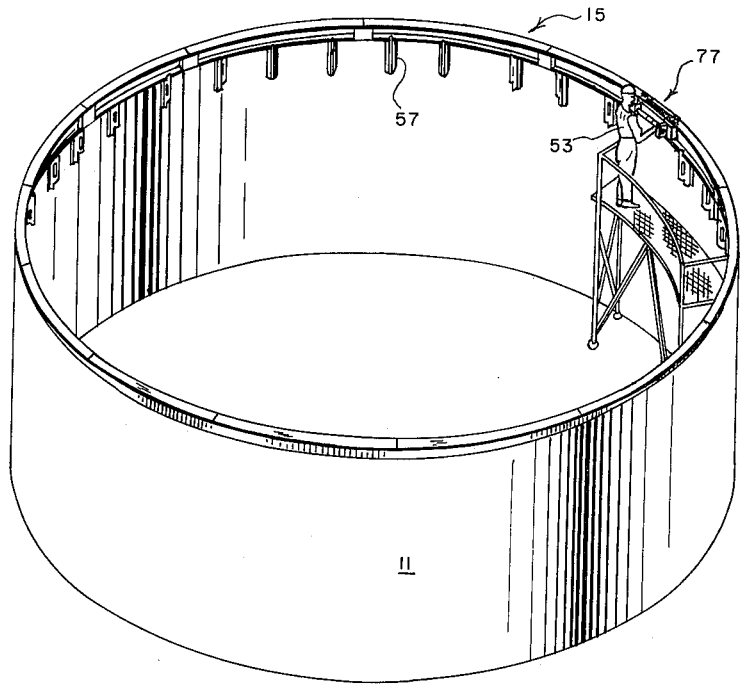
FIGURE 9 is a perspective view illustrating the placing of the final segment of the back-up bar of FIGURE 1, the top tubular section and air hoses being removed for clarity.

The back-up bar segments 17 are assembled along the joint 16 of the two tubular structures 11 and 13 to be welded together by a workman 53 supported on a movable platform 55, as illustrated in FIGURES 5, 7 and 9, who first places a known type vacuum chuck 57 along the inner surface of the first tubular structure 11 adjacent the end edge 60 to be welded.

Figure 6:
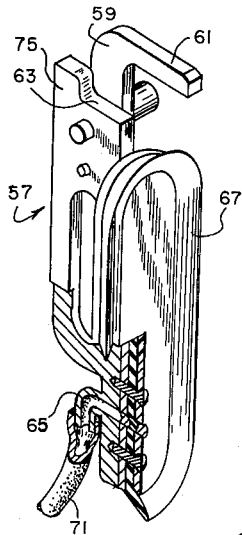
FIGURE 6 is an enlarged perspective view of a vacuum holding device being positioned in FIGURE 5.

As shown best in FIGURE 6, the vacuum chuck 57 has a gauge 59 pivotally fastened to its upper portion by which the workman 53 may easily position the chuck 57 at its proper distance from the joint to be welded. As illustrated in FIGURE 5, the workman 53 places the cantilevered portion 61 of the gauge 57 against the end edge 60 of the tubular section 11 and thereby aligns the vacuum chuck 57 in its proper position for receiving the back-up bar segments 17 upon its supporting surface 63. Following the alignment of the chuck 57, the gauge 59 will be pivoted backwards so as not to interfer with the supporting surface 63 of the chuck 57.

The exhaust port 65 of the vacuum cup 67 of each chuck 57 is joined to a circular manifold hose 69 by a separate hose 71. The manifold hose 69 is in turn connected to a vacuum pump (not shown) by a single hose 73.

Following the placing of the vacuum chuck 57, the workman 53 places each of the back-up bar segments 17 on the chuck's supporting surface 63 in the manner illustrated by FIGURE 7, the upstanding projection 75 (shown in FIGURE 6) of each vacuum chuck 57 serves as a stop to prevent the back-up bar 15 from being accidentally knocked-off the supporting surfaces 63. Adjacent back-up bar segments 17 are joined by the splice plate 39 shown in FIGURE 8 and previously described.

The final arcuate back-up bar segment to be placed by the workman 53 will usually be of a special length frame with the splice plate 39 of the normal segment 17 removed. A typical final back-up bar segment 77, illustrated in FIGURES 9 and 10, consists of the standard I-shaped frame 78 having the inflatable bladder and the flexible, resilient ribbon member with its contact surface plates within the outer channel recess. Although the outer channel recess of the frame 78 is not shown in FIGURES 9 and 10, a cross section view of the frame 78 would be substantially the same as the cross section view shown in FIGURE 2 of the line or normal line segment 17.

Figure 10:
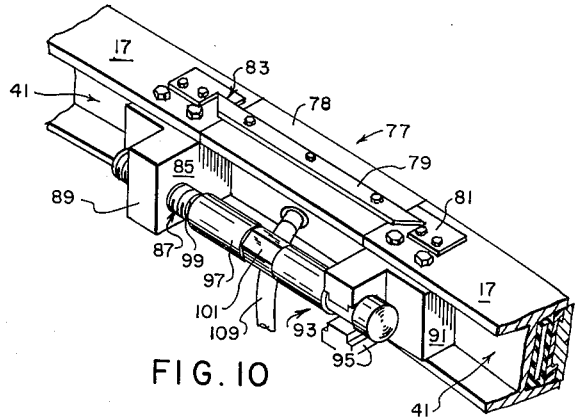
FIGURE 10 is an enlarged perspective view of the final back-up bar segment being placed in FIGURE 9.

An elongated alignment bar 79, however, is secured upon the upper surface of the final back-up bar segment 77 and extends beyond each end of the segment. The contiguous ends of the back-up bar segments 17 adjacent the final back-up segment 77 are also modified as shown by FIGURE 10. Each end has a stop plate 81 upon its upper surface so that when the final segment 77 is dropped between the adjacent segments 17, the final segment 77 may be pushed outwardly until its bar 79 contacts the notched surface 83 of the stop plate 81 which is so located that the contact surface plates (not shown) at the final back-up bar segment 77 will be in perfect alignment with the contact surface plates 25 of the adjacent line segments 17.

The ends of the back-up segments 17 adjacent the final back-up bar segment 77 are further modified as follows. One end of the adjacent normal segments 17 has a L-shaped block 85 secured to the inside recess channel 41 with a longitudinal threaded bore 87 extending through its upstanding leg 89, and the end of the other adjacent normal segment 17 has a L-shaped block 91 secured within its inside recess channel 41 with a slot 93 extending from the end surface of its upstanding leg 95. A known turning screw having a fixed screw 99 threaded into the bore 87 and a sleeve 97 which is notched so as to rotatably fit within the slot 93 is used to tighten the adjacent back-up bar segments 17 against the final back-up bar segment 77. The sleeve 97 is provided with a wrench gripping surface 101 to aid in the rotation of the turning screw.

With the placing of the final back-up segment 77, air pressure is applied through a suitable pump (not shown) by a lead hose 105 (see FIGURE 1 to 7) to a manifold hose 107 which in turn distributes the air by individual hoses 109 to the inflatable bladders 27 of each back-up bar segment. The expansion of the bladders 27 forces the contact surface plates 25 against the inner surfaces of the tubular sections 11 and 13 at opposite sides of the joint 16 causing the two surfaces to align themselves and causing a frictional griping force such that the back-up bar ring 15 becomes self-supporting.

Following the welding operation, the bladders 25 may be deflated and the back-up bar 15 disassembled in a manner reversed to its assembly.

Thus, it can be seen that a novel back-up bar for welding has been disclosed which aids in the alignment of the edges of the tubular sections to be joined and which is substantially self-supporting when in use. Also, the back-up may easily be broken into segments for storage in a minimum of space and later be assembled again.

The resilient and flexible ribbon member and its contact surface plates are longitudinally extending flexible and also yieldable to conform readily to the warpage of the structures along the seam during the welding operations so as to retain all molten metal in the seam during the welding operation.

Also, the bladder and resilient ribbon member may easily be removed and replaced if damaged or adapted to another rigid frame member of another diameter with a minimum of cost.

Obviously many modifications and variations of the present invention are possible in light of the above teachings. It is therefore to be understood that within the scope of the appended claims the invention may be practiced other than as specifically described.

What is claimed is:

1. A back-up bar for use internally at abutting ends of tubular members while said members are being welded together and adapted to be easily removed after the welding operation, comprising:
   (a) a plurality of arcuate short back-up bar segments, joined end-to-end to form a continuous ring;
   (b) each said back-up segment comprising;
      (1) an elongated rigid frame member having an outer channel recess;
      (2) an inflatable bladder at the bottom of the recess of said rigid frame member;

(3) a resilient, flexible ribbon member supported upon said inflatable bladder, and (4) a plurality of elongated contiguous contact surface plates forming the back-up contact surface for said segment;

(5) each said contact surface plate being transversely aligned to said ribbon member and secured thereto whereby the contact surface for said segment will be longitudinally extending flexible and also yieldable to maintain the back-up bar tightly against the internal surface of said tubular members at opposite sides of their abutting edges.

2. A self-supporting back-up bar for use in butt welding tubular structures, comprising:

(a) a plurality of short arcuate back-up bar segments joined end-to-end to form a ring;

(b) each said segment having:
  (1) a rigid frame member;
  (2) an inflatable bladder joined to said rigid frame member;
  (3) an elastomeric ribbon member joined to said bladder;
  (4) a plurality of contiguous plates secured to the outer surface of said ribbon member so that a contact surface is formed which is substantially flexible and yieldable.

3. A back-up bar, comprising:

(a) an elongated rigid frame member having a channel recess;

(b) an inflatable bladder at the bottom of the recess of said frame member.

(c) a resilient, flexible ribbon member supported upon said inflatable bladder;

(d) a plurality of elongated contiguously arranged plates having a lower surface and an upper surface, the upper surfaces of all said plates forming the contact surface for the back-up bar member;

(e) each said plate being transversely aligned to said ribbon member and having its lower surface secured directly to said ribbon member whereby the contact surface for the back-up bar will be longitudinally extending flexible and also yieldable.

4. A backing element for use in welding operations, comprising:

(a) rigid frame member;

(b) an elongated heat resistant elastomeric ribbon member;

(c) an extensible means securing said ribbon member to the surface of said frame member;

(d) a plurality of elongated contiguously arranged plates having a lower surface and an upper surface, the upper surfaces of all said plates forming a back-up contact surface;

(e) each said plate being transversely aligned to said ribbon member and having its lower surface secured directly to the outer surface of said ribbon member whereby said contact surface will be longitudinally extending flexible and also yieldable; and (f) said extensible means adapted to uniformly push the ribbon means so its contact surface plates will press against the surfaces the workpieces being welded;

5. A backing element as defined by claim 4 wherein each said plate has a groove within its upper surface and midway its length for receiving the molten metal from a seam joint during the welding operations to form a bead along the underside of the weld.

References Cited by the Examiner
UNITED STATES PATENTS

| | | | |
|---|---|---|---|
| 1,710,258 | 4/1929 | Hume | 219—160 |
| 1,902,051 | 3/1933 | Wall | 228—50 |
| 1,972,029 | 8/1934 | Norquist | 219—160 |
| 2,430,266 | 11/1947 | Zimmerman | 228—50 |
| 2,631,215 | 3/1953 | Randall et al. | 219—158 |
| 2,987,022 | 6/1961 | Thielsch | 228—50 |

WHITMORE A. WILTZ, *Primary Examiner.*

M. L. FAIGUS, *Assistant Examiner.*